US 6,660,416 B2

(12) United States Patent
Sederquist et al.

(10) Patent No.: US 6,660,416 B2
(45) Date of Patent: Dec. 9, 2003

(54) SELF-INERTING FUEL PROCESSING SYSTEM

(75) Inventors: Richard A. Sederquist, Middletown, CT (US); Kevin Marchand, Burnaby (CA)

(73) Assignee: Ballard Power Systems Inc., Burnaby (CA)

(*) Notice: Subject to any disclaimer, the term of this patent is extended or adjusted under 35 U.S.C. 154(b) by 320 days.

(21) Appl. No.: 09/894,813

(22) Filed: Jun. 28, 2001

(65) Prior Publication Data

US 2003/0003332 A1 Jan. 2, 2003

(51) Int. Cl.[7] .................................................. H01M 8/18
(52) U.S. Cl. ............................ 429/19; 429/22; 429/25; 429/26; 429/13; 429/17
(58) Field of Search ............................ 429/13, 17, 19, 429/22, 25, 26

(56) References Cited

U.S. PATENT DOCUMENTS

| | | | | |
|---|---|---|---|---|
| 4,963,443 | A | | 10/1990 | Kamoshita ................ 429/17 |
| 4,965,143 | A | * | 10/1990 | Mizuno et al. ............ 429/17 |
| 5,013,617 | A | | 5/1991 | Scheffler .................. 429/17 |
| 5,045,414 | A | | 9/1991 | Bushnell et al. .......... 429/17 |
| 5,154,986 | A | | 10/1992 | Takechi et al. ........... 429/23 |
| 5,462,815 | A | | 10/1995 | Horiuchi .................. 429/13 |
| 5,648,182 | A | | 7/1997 | Hara et al. ................ 429/20 |
| 6,127,057 | A | | 10/2000 | Gorman .................... 429/25 |
| 6,303,244 | B1 | * | 10/2001 | Surampudi et al. ....... 429/17 |
| 6,306,531 | B1 | * | 10/2001 | Clingerman et al. ...... 429/19 |
| 6,312,842 | B1 | * | 11/2001 | Reiser et al. ............. 429/13 |
| 6,391,484 | B1 | * | 5/2002 | Keskula et al. ........... 429/13 |
| 6,451,464 | B1 | * | 9/2002 | Edlund et al. ............ 429/19 |
| 6,492,056 | B1 | * | 12/2002 | Ovshinsky ................ 429/40 |

FOREIGN PATENT DOCUMENTS

| | | |
|---|---|---|
| EP | 700 107 B1 | 12/2000 |
| WO | WO 91/10266 | 7/1991 |
| WO | WO 01/25140 A1 | 4/2001 |

OTHER PUBLICATIONS

Abstract of JP 02–117071, www.esp@cenet.com, May 1, 1990.
Abstract of JP 03–145065, www.esp@cenet.com, Jun. 20, 1991.
Abstract of JP 03–163762, www.esp@cenet.com, Jul. 15, 1991.
Abstract of JP 03–257762, www.esp@cenet.com, Nov. 18, 1991.
Abstract of JP 04–026070, www.esp@cenet.com, Jan. 29, 1992.
Abstract of JP 04–067572, www.esp@cenet.com, Mar. 3, 1992.
Abstract of JP 03–005301, European Patent Office, Jan. 11, 1991.

* cited by examiner

Primary Examiner—Bruce F. Bell
(74) Attorney, Agent, or Firm—Seed Ip Law Group PLLC

(57) ABSTRACT

A self-inerting fuel processing system is provided. In one embodiment, the present fuel processing system comprises a fuel processor comprising a reformer, at least one self-reducing catalyst bed, a recycle loop for circulating a gas stream through the fuel processor and the self-reducing catalyst bed(s) during shutdown of the fuel processing system, and an oxidant supply for introducing oxidant into the recycle loop during shutdown of the fuel processing system. A method for shutting down the fuel processing system is provided. A fuel cell electric power generation system incorporating the present fuel processing system is also provided.

54 Claims, 5 Drawing Sheets

SELF-INERTING FUEL PROCESSING SYSTEM

BACKGROUND OF THE INVENTION

1. Field of the Invention

The present invention relates to self-inerting fuel processing systems, methods of shutting down such fuel processing systems, and fuel cell electric power generation systems incorporating them.

2. Description of the Related Art

Fuel cell electric power generation systems comprising a fuel cell stack and a fuel processing system for converting a fuel into a hydrogen-rich reformate stream and supplying it to the fuel cell stack can be operated to provide electric power.

On shutdown of such fuel cell electric power generation systems, the fuel processing system and (optionally) the fuel cell stack are typically purged of reactant gases, including residual fuel, reformate and other reaction products. Purging is typically performed using an inert gas stream, such as nitrogen.

Purging the anode passages of the fuel cell stack assists in preventing electrochemical reactions from proceeding within the fuel cells on shutdown, such as the generation of water at the cathodes. It also reduces the electric potential of the stack, which may be desirable in some applications.

Typical fuel processing components in such systems include reformers, such as steam reformers, for example, and may also include shift reactors and/or selective oxidizers. These components are purged to reduce deterioration of the components that can occur when reactant gases are present in them at temperatures below their normal operating temperatures. The presence of reactants at lower temperatures can result in carbon deposition and/or water condensation on the catalyst bed(s) of the component(s) and carbonyl formation, for example.

Conventional fuel cell electric power generation systems typically employ pressurized nitrogen supplied from a nitrogen gas cylinder for purging. This approach undesirably increases the size and weight of the overall electric power generation system and requires maintenance to exchange an empty gas cylinder with a new one. Further, the operating cost of the electric power generation system is increased due to the expense of the inert gas supply.

SUMMARY OF THE INVENTION

A self-inerting fuel processing system is provided. In one embodiment, the present fuel processing system comprises:

(a) a fuel processor comprising a reformer for reforming a fuel to a reformate stream comprising hydrogen;

(b) at least one self-reducing catalyst bed;

(c) a recycle loop for circulating a gas stream through the fuel processor and the self-reducing catalyst bed(s) during shutdown of the fuel processing system; and (d) an oxidant supply for introducing oxidant into the recycle loop during shutdown of the fuel processing system.

A method of shutting down the present fuel processing system is also provided. In one embodiment, the present method comprises:

(a) interrupting supply of fuel to the fuel processor;

(b) introducing an oxidant into the recycle loop;

(c) removing at least a portion of the oxygen in the introduced oxidant by oxidizing the self-reducing catalyst bed(s) to produce a substantially inert gas stream;

(d) purging reaction gas from the fuel processor, wherein the reaction gas comprises fuel, reformate, or both; and (e) circulating the substantially inert gas stream in the recycle loop.

A self-inerting fuel cell electric power generation system is also provided. In one embodiment, the present electric power generation system comprises:

(a) a fuel processor comprising a reformer for reforming a fuel to a reformats stream comprising hydrogen;

(b) at least one self-reducing catalyst bed;

(c) a fuel cell stack fluidly connected to the fuel processor for receiving the reformate stream;

(d) a recycle loop for circulating a gas stream through the fuel processor and the self-reducing catalyst bed(s) during shutdown of the fuel processing system; and (e) an oxidant supply for introducing an oxidant into the recycle loop during shutdown of the fuel processing system.

DETAILED DESCRIPTION OF PREFERRED EMBODIMENTS

Figure 1:
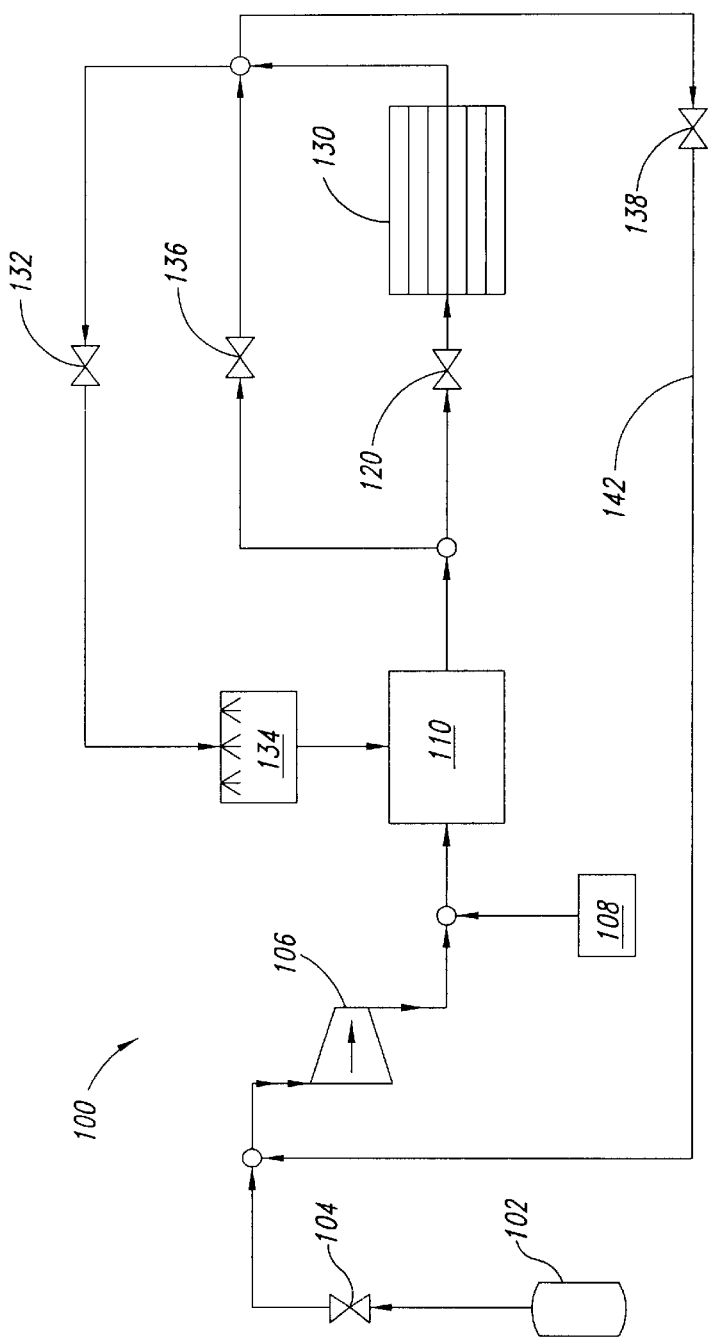
FIGS. 1–5 are schematic representations of certain embodiments of the present fuel processing system and fuel cell electric power generation system.

As described herein and in the appended claims, fuel means gaseous or liquid fuels comprising aliphatic hydrocarbons and oxygenated derivatives thereof, and may further comprise aromatic hydrocarbons and oxygenated derivatives thereof. Reformate means the gas stream comprising hydrogen produced from a fuel by a fuel processing system or component(s) thereof, including but not limited to reformers, shift reactors, selective oxidizers, one or more sulfur removal apparatus, pressure swing adsorption ("PSA") units, or combinations thereof. Oxidant means a gas stream comprising inert gas and oxygen, such as air, cathode exhaust gas, burner exhaust gas, or PSA off-gas, for example. PSA off-gas means an inert gas-enriched, oxygen-depleted gas stream produced by a PSA unit. PSA off-gas may be produced by systems such as those described in published PCT Application No. WO 00/16425, for example. Inert gas means an unreactive gas stream comprising nitrogen, helium, or argon, for example.

Reformer means any apparatus suitable for converting a fuel into a reformate stream and includes but is not necessarily limited to steam reformers, partial oxidation reformers, catalytic partial oxidation reformers, autothermal reformers, and plasma reformers. Reformers may be of any suitable construction, such as tubular, shell-and-tube or plate-and-frame, for example.

A steam reformer is a reformer comprising a steam reforming catalyst bed and a heat transfer surface for transferring the heat supplied by burner combustion gases to the catalyst bed. The burner may be integrated into the steam reformer vessel, or it may be separately housed. Again, the steam reformer may be of any suitable construction, such as shell-and-tube or plate-and-frame, for example.

"Catalyst bed" comprises the catalyst composition employed in a particular fuel processing component and includes the catalyst bed structure. Suitable catalyst bed structures include particulate catalyst components and monoliths. For example, suitable catalyst bed structures include catalyst components disposed on a pelletized porous support, or disposed on a monolithic porous support, such as ceramic honeycomb or expanded metal foam, for instance.

Unless otherwise specified, a shift reactor may have a catalyst bed comprising low-temperature, medium-temperature, or high-temperature shift catalyst compositions, or any combination thereof. For example, a low- or medium-temperature shift catalyst bed may comprise a copper-containing composition such as Cu/Zn oxide shift catalyst, and a high-temperature shift catalyst bed may comprise an iron-containing composition such as Fe/Cr shift catalyst.

As used herein, when two components are fluidly connected to one another, there may be other components in between them, and the other components may effect the fluid connection but not eliminate it altogether. An open line means a conduit having one end open to air that may be valved.

In FIGS. 1–5, similar components are given similar reference numbers.

FIG. 1 is a schematic representation of an embodiment of the present self-inerting fuel processing system and fuel cell electric power generation system. During normal operation of fuel processing system 100, fuel from fuel source 102 is supplied via valve 104 to fuel compressor 106 and is compressed to produce a pressurized fuel stream. Steam from steam supply 108 is mixed with the pressurized fuel stream exiting fuel compressor 106 to produce a reactant stream, which is supplied to fuel processor 110. Fuel processor 110 converts the reactant stream to a reformate stream comprising hydrogen.

The reformate stream exiting fuel processor 110 is then supplied via valve 120 to the anodes of fuel cells comprising fuel cell stack 130. Fuel cell stack 130 may then generate electricity from the reformate stream. For example, a fuel cell stack such as that disclosed in U.S. Pat. No. 5,484,666, which is incorporated herein by reference in its entirety, may be employed.

The hydrogen-depleted anode exhaust stream exiting from fuel cell stack 130 is then supplied via valve 132 to burner 134, as valves 136 and 138 are typically closed during normal operation of fuel processing system 100. The anode exhaust stream is combusted within burner 134 to produce a hot burner gas stream that is supplied to fuel processor 110 and is in heat exchange relationship therewith. The cooled burner exhaust gas is then exhausted.

On shutdown, the flow of fuel from fuel supply 102 is interrupted by shutting valve 104 and fuel compressor 106 is stopped. Steam from steam supply 108 then purges fuel processor 110. If desired, the steam may also purge reformate from fuel cell stack 130 before being vented from the system. Alternatively, valve 120 may be closed and valve 136 opened so that the purged gases will by-pass stack 130 before being vented. As a further alternative, valves 120 and 136 may be operated to first by-pass fuel cell stack 130 and then purge it once the lines upstream of fuel cell stack 130 are substantially filled with steam. In this way, it may be possible to reduce the exposure of fuel cell components to potentially detrimental components of the purged gas, such as carbon monoxide, for example, while still purging the stack.

Steam may be supplied to fuel processing system 100 until substantially all of the reactants and/or reformate is purged. For example, steam purging could continue until combustion ceases in burner 134, which may be a useful indicator that purging is substantially complete. Other means of determining when the system is substantially purged will be apparent to persons skilled in the art.

Following steam purging, supply of steam to fuel processing system 100 is interrupted, valve 138 is opened, and fuel compressor 106 is re-started. As a result, gases present circulate via line 142 through fuel processor 110 (and, optionally, through fuel cell stack 130), instead of being vented.

As the temperature of fuel processing system 100 decreases and the volume of circulating gases therein also decreases, oxidant (in this case, air) is introduced into line 142 via the exhaust outlet of burner 134 and is circulated. At least a portion of the oxygen in the air oxidizes a self-reducing catalyst bed within fuel processor 110 and is consumed, producing a "blanket" of inert gas within fuel processing system 100. During the cool-down period, fuel compressor 106 may be operated continuously or intermittently, as desired. Once the temperature of fuel processing system 100 reaches a suitable shutdown temperature, valve 132 may be shut, if desired, to prevent further entry of air into the system.

Fuel processor 110 comprises a suitable reformer for converting a hydrocarbon fuel to a reformate stream comprising hydrogen. Fuel processor 110 may also comprise other fuel processing components, such as desulfurizers, preoxidizers, shift reactors, PSA units and/or selective oxidizers, for example. Those skilled in the art can select suitable fuel processor components for a given application.

The upstream catalyst bed(s) of fuel processor 110 should comprise self-reducing catalyst compositions. In this context, "self-reducing" means the catalyst compositions are capable of being oxidized, thereby consuming oxygen in the oxidant introduced into the system, and of being re-reduced with reformate and/or fuel during start-up. More specifically, a self-reducing catalyst composition has a reduction exothermal temperature rise in the presence of reformate that is less than the difference between the maximum operating temperature for the catalyst and the inlet temperature of the reformate introduced into the catalyst bed that starts the reduction process and the exothermal temperature rise (if any) associated with the other reactions taking place in the bed.

For example, catalyst compositions comprising Cu, Ni, or other metals having different oxidation states, such as Fe, chromia, or ceria, for example, may be suitable self-reducing catalysts. Other catalyst compositions may also be suitable, providing that they meet the criteria for self-reducing catalyst compositions described above.

Auxiliary beds comprising a self-reducing catalyst bed may also be employed for the purpose of consuming oxygen present in the circulating oxidant during shutdown, if desired.

The upstream bed(s) of fuel processor 110 may comprise oxygen-tolerant catalyst compositions. This would allow for catalytic combustion of at least a portion of the oxygen present in the introduced oxidant with fuel and/or hydrogen present in the catalyst bed during the initial phase of shutdown. For example, selective oxidizer catalyst compositions and noble metal reforming catalyst compositions may be employed. In addition, oxygen-tolerant shift catalyst compositions may also be employed, such as bifunctional shift catalysts developed by Argonne National Laboratory (Argonne, Ill., USA) incorporating bimetallic/polymetallic oxide compositions, for example. Suitable metals for use in these catalyst compositions include Pt, Ru, Pd, Pt/Ru, Pt/Cu, Co, Ag, Fe, Cu, and Mo. Suitable metal oxide supports include lanthanide oxides, manganese oxides, vanadium oxide, and mixed metal oxides. (See, for example, Myers et al., "Alternative Water-Gas Shift Catalyst Development", in *Transportation Fuel Cell Power Systems,* 2000 *Annual*

*Progress Report,* by U.S. Department of Energy. Washington, D.C., U.S. Department of Energy, October 2000.)

Figure 2:
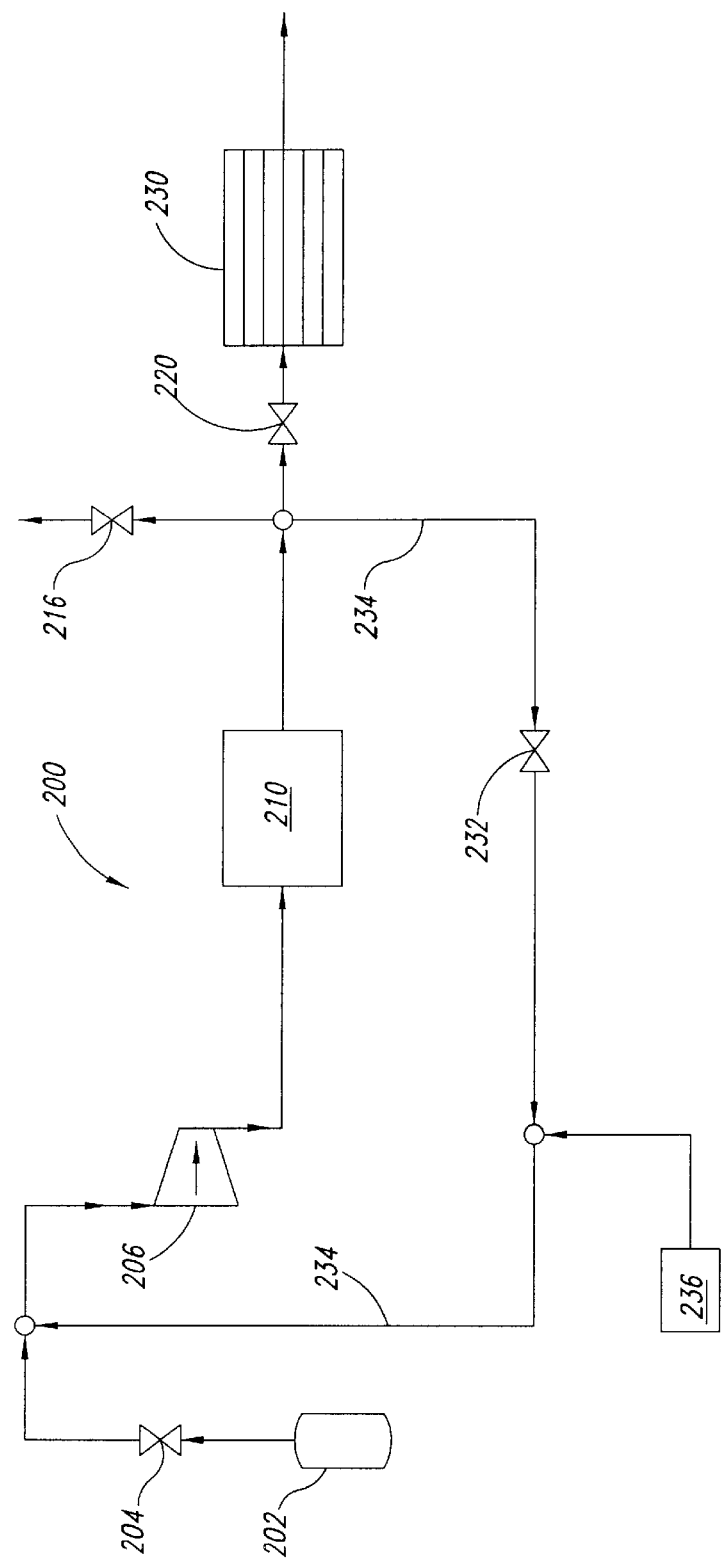

FIG. 2 is a schematic representation of another embodiment of the present self-inerting fuel processing system and fuel cell electric power generation system. During normal operation, fuel processing system 200 functions in a manner similar to fuel processing system 100, as discussed above, except that the anode exhaust stream from stack 230 is not provided to a burner. Note that valve 232 is closed during normal operation.

On shutdown, valve 204 is closed. With valve 204 closed the operation of fuel compressor 206 causes a reduced pressure in line 234. In response, oxidant supply 236 introduces oxidant into line 234. As oxidant introduced into line 234 enters fuel processor 210, at least a portion of the oxygen therein is consumed as the upstream catalyst bed(s) thereof are oxidized. Further, where oxygen is present with fuel and/or reformate in the self-reducing catalyst bed, there is the potential for combustion reactions to occur that assist in consuming the oxygen. In addition, where the self-reducing catalyst bed comprises a selective oxidation catalyst [or shift catalyst?], at least a portion of hydrogen and carbon monoxide (if any) present may also be consumed. As a result, an inert gas stream is produced.

The pressurized gas stream exiting fuel compressor 206 then purges fuel processor 210. If desired, the gas stream may also purge reformate from fuel cell stack 230 before being vented. Alternatively, valve 220 may be closed and valve 216 opened so that the purged gases will by-pass stack 230 before being vented. As a further alternative, valves 220 and 216 may be operated to first by-pass fuel cell stack 230 and then purge it once substantially all of the fuel and/or reformate has been purged from the lines upstream of fuel cell stack 230.

Following purging, valves 216 and 220 are closed and valve 232 is opened, allowing the inert gas stream to circulate via line 234 through fuel processor 210.

As the temperature of fuel processing system 200 decreases and the volume of circulating gases therein also decreases, oxidant is introduced into line 234 via oxidant supply 236 and is circulated. Alternatively, valve 216 may be left open after purging and oxidant (air) allowed to enter fuel processing system 200 from the resulting open line instead of, or in addition to, oxidant supply 236. At least a portion of the oxygen in the introduced oxidant oxidizes a self-reducing catalyst bed within fuel processor 210 and is consumed. During the cool-down period, fuel compressor 206 may be operated continuously or intermittently, as desired. Once the temperature of fuel processing system 200 reaches a suitable shutdown temperature, fuel compressor 206 may be stopped and valve 216 closed (if open).

Fuel processor 210 is substantially the same as fuel processor 110 in FIG. 1, discussed above.

Oxidant supply 236 comprises a suitable structure for introducing oxidant into line 234. Non-exhaustive examples of suitable oxidant supply structures include:

(a) an open line for allowing air to be introduced into the system;
(b) a check valve for allowing air to be introduced into the system;
(c) a pressurized oxidant source, such as an air compressor or an oxidant storage container;
(d) a cathode exhaust gas outlet;
(e) a burner exhaust gas outlet, such as for a burner associated with a steam reformer; or
(f) a PSA off-gas outlet.

Although not shown in FIG. 2, power generation system 200 also comprises the desired valving, connecting lines and/or control systems required to introduce oxidant from oxidant supply 236 to the fuel processing system during shutdown. Suitable such components depend on the particular fuel processing system configuration and will be apparent to persons skilled in the art. For example, cathode exhaust, burner exhaust or PSA off-gas will be generated during normal operation of the fuel processing system, but will typically be used as an oxidant only during shutdown. Thus, such oxidants may require more complex valving, connecting lines and/or control systems compared to open lines or check valves for introducing air into the system.

Figure 3:
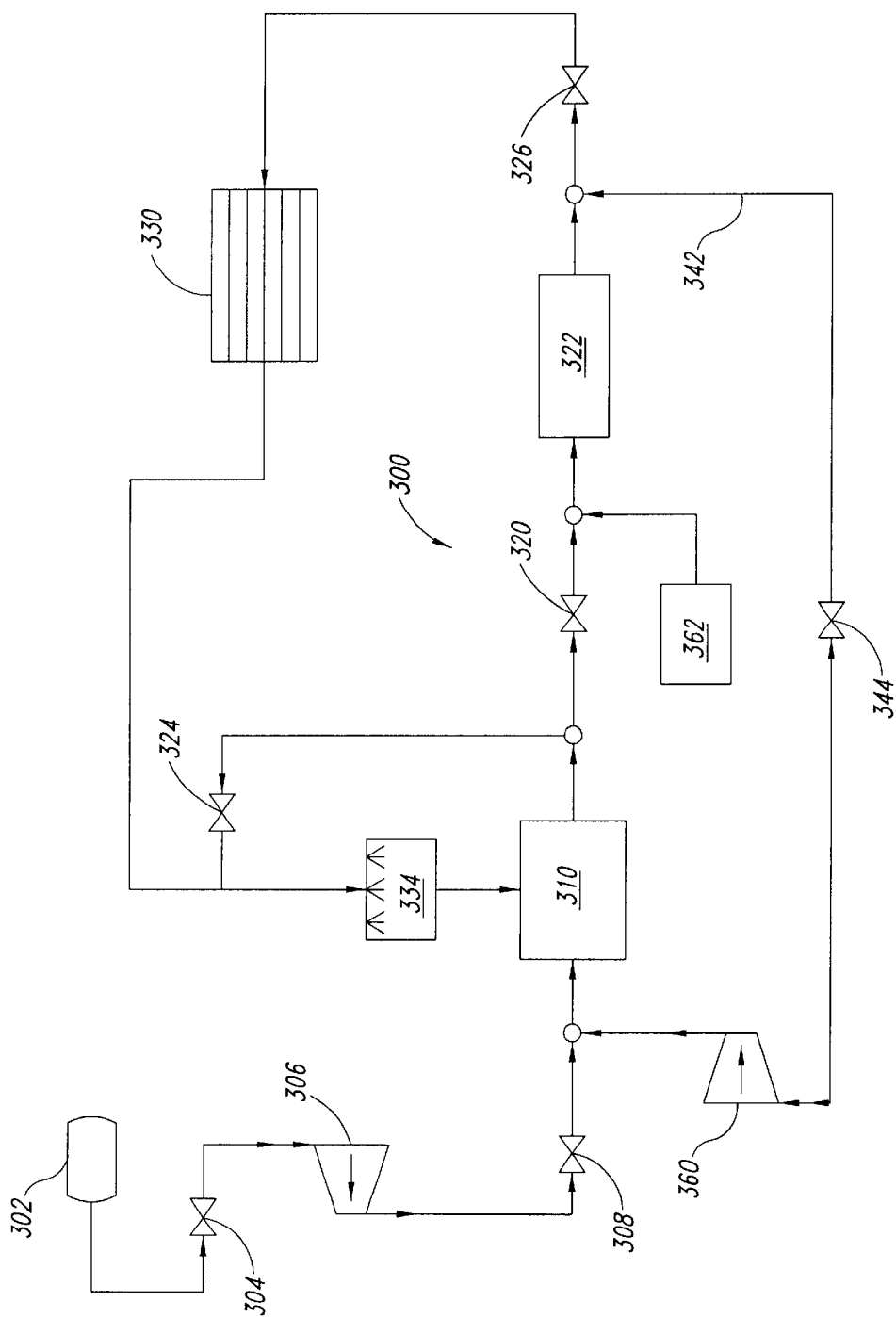

FIG. 3 is a schematic representation of another embodiment of the present self-inerting fuel processing system and fuel cell electric power generation system. During normal operation, fuel processing system 300 functions in a manner similar to fuel processing system 100 of FIG. 1, as discussed above. However, in fuel processing system 300, reformate exiting fuel processor 310 enters auxiliary bed 322 comprising a self-reducing catalyst bed, as valve 324 is typically closed during normal operation. The flow of hydrogen through auxiliary bed 322 maintains the self-reducing catalyst bed therein in a reduced state. The reformate stream is then supplied via valve 326 to stack 330. Note also that valve 344 may be closed during normal operation.

On shutdown, the flow of fuel from fuel supply 302 may be interrupted by shutting valve 304. Fuel compressor 306 is stopped and valve 308 may be closed. Valve 324 is opened (as is valve 344, if closed), valves 320 and 326 are closed, and recycle compressor 360 is started. Oxidant is introduced via oxidant supply 362 to auxiliary bed 322 and at least a portion of the oxygen present is consumed therein. The gas stream exiting auxiliary bed 322 then flows through line 342 before being supplied to recycle compressor 360 as an inert gas stream.

The pressurized gas stream exiting recycle compressor 360 then purges fuel processor 310 and is vented via the exhaust outlet of burner 334. Venting could continue until combustion ceases in burner 334, for example, which may be a useful indicator that the purge gas is sufficiently inert. Valve 324 could then be closed, valve 320 opened, and the inert gas stream recycled through the system.

Alternatively, the purge gas could simply be recycled without venting by leaving valve 324 closed. Catalytic combustion reactions may reduce or eliminate any residual fuel and/or reformate in the purge gas, as discussed above. Whether the purge gas could be recycled without venting will depend on, among other things, the relative amounts of residual fuel and/or reformate present, the amount of oxygen present in the oxidant, and the nature of the self-reducing catalyst bed(s), and the rate of cooling of the fuel processing system. Such variables are system-dependent and whether the purge gas may be recycled without venting in a particular system may be readily determined by persons skilled in the art.

As the temperature of fuel processing system 300 decreases and the volume of circulating gases therein also decreases, oxidant is introduced into the system via oxidant supply 362 and is circulated. At least a portion of the oxygen in the oxidant is consumed within auxiliary bed 322, as described. Alternatively, valves 324 may be left open after purging and oxidant (air) allowed to enter fuel processing system 300 from the exhaust outlet of burner 334 instead of, or in addition to, oxidant supply 362.

During the cool-down period, recycle compressor 360 may be operated continuously or intermittently, as desired.

Once the temperature of fuel processing system 300 reaches a suitable shutdown temperature, recycle compressor 360 may be stopped and any remaining open valves may be closed.

Fuel processor 310 is substantially the same as fuel processor 210 in FIG. 2, discussed above. However, since the upstream catalyst bed(s) of fuel processor 310 are exposed to an inert gas stream during shutdown, they need not comprise a self-reducing catalyst composition.

Similarly, oxidant supply 362 is substantially the same as oxidant supply 236 in FIG. 2, discussed above.

Figure 4:
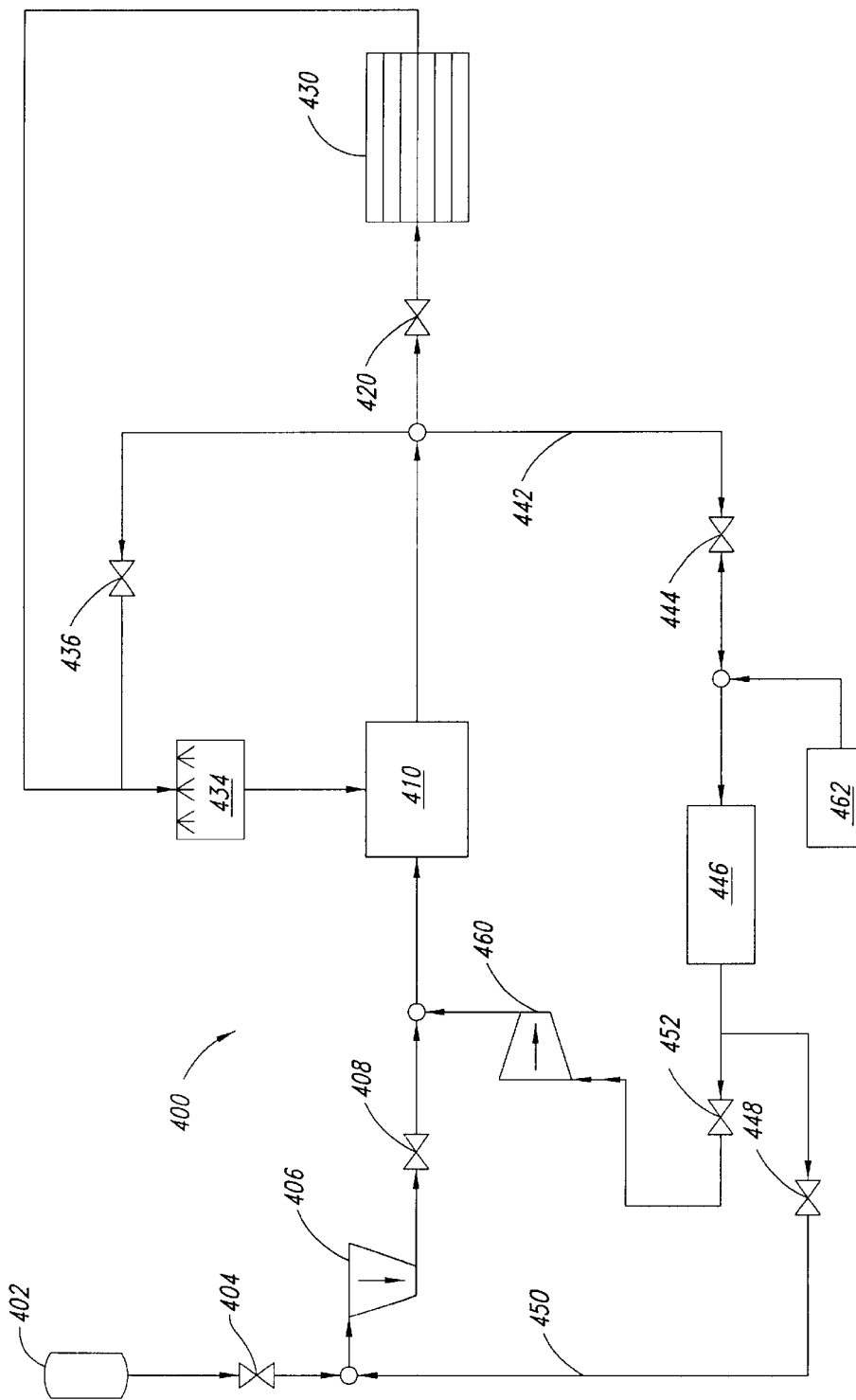

FIG. 4 is a schematic representation of another embodiment of the present self-inerting fuel processing system and fuel cell electric power generation system. During normal operation, fuel processing system 400 functions in a manner similar to fuel processing system 100 of FIG. 1, as discussed above.

However, a small amount of the reformate stream exiting from fuel processor 410 is also supplied via line 442 and valve 444 to auxiliary bed 446 comprising a self-reducing catalyst bed. The flow of hydrogen through auxiliary bed 446 maintains the self-reducing catalyst bed therein in a reduced state. The reformate stream is then supplied via valve 448 to line 450, as valve 452 is typically closed during normal operation of fuel processing system 400. The reformate stream is then recycled to fuel compressor 406.

On shutdown, the flow of fuel from fuel supply 402 may be interrupted by shutting valve 404. Fuel compressor 406 is stopped and valve 408 may be closed. Valves 444 and 448 are also closed, valve 452 is opened, and recycle compressor 460 is started. Oxidant is introduced into line 442 via oxidant supply 462 and at least a portion of the oxygen therein is consumed in auxiliary bed 446 before being supplied to recycle compressor 460 as an inert gas stream.

The pressurized gas stream exiting recycle compressor 460 then purges fuel processor 410. If desired, the gas stream may also purge reformate from fuel cell stack 430 before being vented from the system via burner 434. Alternatively, valve 420 may be closed and valve 436 opened so that the purged gases will by-pass stack 430 before being vented. As a further alternative, valves 420 and 446 may be operated to first by-pass fuel cell stack 430 and then purge it the fuel and/or reformate has been substantially purged from the lines upstream of fuel cell stack 430.

The gas stream is vented from fuel processing system 400 until substantially all of the reactants and/or reformate is purged. For example, purging could continue until combustion ceases in burner 434, which may be a useful indicator that the purge gas is sufficiently inert.

Following purging, valve 436 may be closed and valve 444 is opened, allowing the inert gas stream to circulate via line 442 through fuel processor 410 (and, optionally, through fuel cell stack 430).

As the temperature of fuel processing system 400 decreases and the volume of circulating gases therein also decreases, oxidant is introduced into line 442 via oxidant supply 462 and is circulated. Alternatively, valve 436 may be left open after purging and oxidant (air) allowed to enter fuel processing system 400 from the exhaust outlet of burner 434 instead of, or in addition to, oxidant supply 462. At least a portion of the oxygen in the oxidant is consumed within auxiliary bed 446, as described. During the cool-down period, recycle compressor 460 may be operated continuously or intermittently, as desired. Once the temperature of fuel processing system 400 reaches a suitable shutdown temperature, recycle compressor 460 may be stopped and valve 436 closed (if open).

Fuel processor 410 is substantially the same as fuel processor 310 in FIG. 3, discussed above. In this embodiment, fuel processor 410 may comprise an upstream desulfurizer such as the combination of a hydrodesulfurizer (HDS) and an $H_2S$ removal device, such as a ZnO bed, or other reduced base metal absorbent beds, for example. In this example, the reformate supplied from line 450 could also be supplied to the HDS during normal operation. Further, fuel processor 410 may also comprise a preoxidizer located upstream of the HDS. If desired, the preoxidizer may comprise a self-reducing catalyst bed, in which case the preoxidizer may augment or replace auxiliary bed 446.

Similarly, oxidant supply 462 is substantially the same as oxidant supply 362 in FIG. 3, discussed above.

Figure 5:
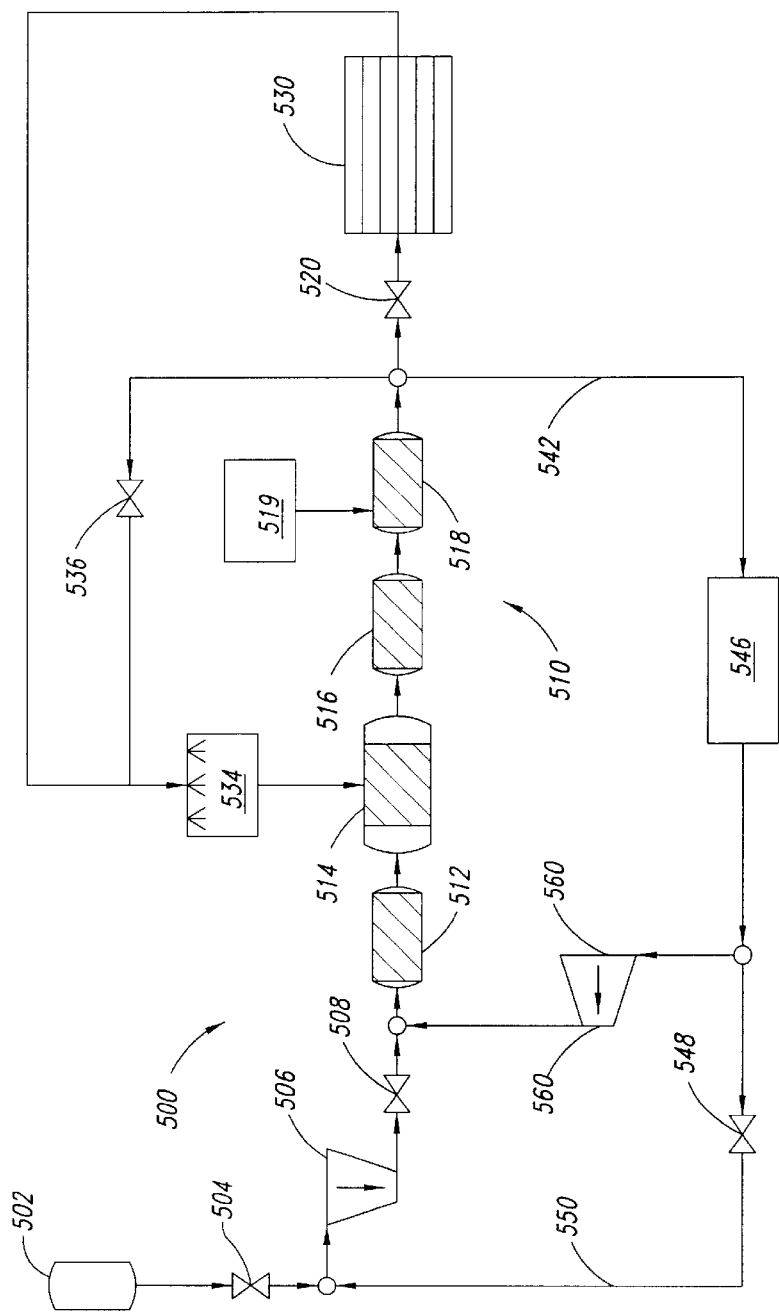

FIG. 5 is a schematic representation of another embodiment of the present self-inerting fuel processing system and fuel cell electric power generation system. During normal operation, fuel processing system 500 functions in a manner similar to fuel processing system 300 of FIG. 3, as discussed above. For example, a portion of the reformate stream exiting fuel processor 510 is diverted to auxiliary bed 546 via line 542. The flow of hydrogen through auxiliary bed 546 maintains the self-reducing catalyst bed therein in a reduced state. The reformate stream is then supplied via valve 548 to line 550, and from there is recycled to fuel compressor 506.

In fuel processor 510, the pressurized fuel stream from fuel compressor 506 is directed to desulfurizer 512, where sulfur present in the fuel stream is reduced or eliminated. The desulfurized fuel stream is then directed to reformer 514 and reformed. The reformate exiting reformer 514 is then directed to shift reactor 516 and selective oxidizer 518, respectively, where the concentration of carbon monoxide present in the reformate is reduced. Air required by selective oxidizer 518 is supplied via air supply 519.

On shutdown, the flow of fuel from fuel supply 502 may be interrupted by shutting valve 504. Fuel compressor 506 is stopped and valve 508 may be closed. Valves 520 and 536 may also be closed. Recycle compressor 560 is then started. Residual fuel remaining in fuel processor 510 is reformed in reformer 514. The flow of air from air supply 519 to selective oxidizer 518 is reduced to a suitable shutdown flow rate. Air from supply 519 provides oxygen for consuming residual hydrogen and carbon monoxide in selective oxidizer 518, and auxiliary bed 546 consumes at least a portion of the remaining oxygen present. The gas stream exiting auxiliary bed 546 is then supplied to recycle compressor 560 as an inert gas stream.

As the temperature of fuel processing system 500 decreases and the volume of circulating gases therein also decreases, oxidant (air) may be supplied to the system via supply 519 and circulated. At least a portion of the oxygen in the air is consumed within auxiliary bed 546, as described. Alternatively, valve 536 may be left open after purging and air allowed to enter fuel processing system 500 from exhaust 540 instead of, or in addition to, supply 519.

During the cool-down period, recycle compressor 560 may be operated continuously or intermittently, as desired. Once the temperature of fuel processing system 500 reaches a suitable shutdown temperature, recycle compressor 560 may be stopped and any remaining open valves may be closed.

Although desulfurizer 512 is schematically illustrated as a single vessel in FIG. 5, it is understood that it may comprise more than one component, such as a combination of HDS and a ZnO bed, for example. Desulfurizer 512 may further comprise a preoxidizer comprising a self-reducing catalyst bed located upstream of the HDS, in which case the preoxidizer may augment or replace auxiliary bed 546.

It is to be understood that the compressors illustrated in FIGS. 1–5 are schematic representations only. The choice of compressor will depend upon the particular application, and suitable reciprocating or rotating compressors will be apparent to persons skilled in the art. Similarly, it is to be understood that the valving arrangements shown in FIGS. 1–5 are illustrative only; other valving arrangements will be apparent to persons skilled in the art.

The use of oxygen-depleted oxidant sources (relative to air), such as cathode exhaust gas, burner exhaust gas, or PSA off-gas, for example, may permit the selection of smaller self-reducing catalyst beds, since a relatively smaller amount of catalyst may be oxidized by a given volume of oxidant. Where an auxiliary bed is employed, the use of oxygen-depleted oxidant sources may provide for a corresponding decrease in the size and cost of the auxiliary bed.

In the present self-inerting fuel processing system, the ability to circulate an inert gas stream may allow for quicker start up. As the fuel processing components are heated during start-up, the inert gas stream is also heated, and the ability to circulate the heated inert gas stream may reduce the time required to bring the system to operating temperature.

While particular elements, embodiments and applications of the present invention have been shown and described, it will be understood, of course, that the invention is not limited thereto since modifications may be made by those skilled in the art, particularly in light of the foregoing teachings. It is therefore contemplated by the appended claims to cover such modifications that incorporate those features coming within the scope of the invention.

What is claimed is:

1. A self-inerting fuel cell electric power generation system comprising:
    (a) a fuel processor comprising a reformer for reforming a fuel to a reformate stream comprising hydrogen;
    (b) at least one self-reducing catalyst bed;
    (c) a fuel cell stack fluidly connected to the fuel processor for receiving the reformate stream;
    (d) a recycle loop for circulating a gas stream through the fuel processor and the at least one self-reducing catalyst bed during shutdown of the fuel processing system; and
    (e) an oxidant supply fluidly connected to the recycle loop for introducing an oxidant into the recycle loop during shutdown of the fuel processing system.

2. The power generation system of claim 1 wherein the fuel cell stack is fluidly connected to the recycle loop for circulating the gas stream through the fuel cell stack.

3. The power generation system of claim 1 wherein the reformer is a steam reformer, the power generation system further comprising a steam supply for supplying steam to the reformer.

4. The power generation system of claim 1, further comprising a compressor fluidly connected to the recycle loop.

5. The power generation system of claim 1 wherein the oxidant supply is selected from the group consisting of open lines, check valves, pressurized oxidant storage containers, air compressors, cathode exhaust gas outlets, burner exhaust gas outlets, and PSA off-gas outlets.

6. The power generation system of claim 1 wherein the oxidant supply comprises an open first line.

7. The power generation system of claim 1, further comprising a purge line fluidly connected to the fuel processor for purging reformate from the fuel processor during shutdown of the fuel processing system.

8. The power generation system of claim 7 wherein the purge line is fluidly connected to the fuel cell stack for purging reformate therefrom during shutdown of the fuel processing system.

9. The power generation system of claim 7 wherein the reformer is a steam reformer comprising a burner, and wherein the first line is fluidly connected to the burner.

10. The power generation system of claim 1 wherein the oxidant supply comprises a check valve.

11. The power generation system of claim 1 wherein the fuel cell stack comprises a cathode exhaust outlet and the oxidant supply comprises the cathode exhaust outlet.

12. The power generation system of claim 1 wherein the fuel processor further comprises a PSA unit fluidly connected to the reformer, the PSA unit having an off-gas exhaust outlet, and wherein the oxidant supply comprises the PSA off-gas exhaust outlet.

13. The power generation system of claim 1 wherein the fuel processor further comprises a burner associated with the reformer, the burner having an exhaust outlet, and wherein the oxidant supply comprises the burner exhaust outlet.

14. The power generation system of claim 1 wherein the fuel processor further comprises a selective oxidizer downstream of the reformer and fluidly connected thereto, and an air supply fluidly connected to the selective oxidizer, and wherein the oxidant supply comprises the air supply connected to the selective oxidizer.

15. The power generation system of claim 1 wherein the fuel processor further comprises a preoxidizer upstream of the reformer and fluidly connected thereto.

16. The power generation system of claim 1 wherein the fuel processor further comprises a desulfurizer upstream of the reformer and fluidly connected thereto.

17. The power generation system of claim 1 wherein the fuel processor further comprises a shift reactor downstream of the reformer and fluidly connected thereto.

18. The power generation system of claim 1 wherein the fuel processor further comprises a selective oxidizer downstream of the reformer and fluidly connected thereto.

19. The power generation system of claim 1 wherein the fuel processor further comprises a PSA unit fluidly connected to the reformer.

20. The power generation system of claim 1 wherein the fuel processor comprises the at least one self-reducing catalyst bed.

21. The power generation system of claim 1 wherein the reformer comprises the at least one self-reducing catalyst bed.

22. The power generation system of claim 1, further comprising an auxiliary bed comprising the at least one self-reducing catalyst bed.

23. A self-inerting fuel cell electric power generation system comprising:
    (a) a fuel processor comprising a reformer for reforming a fuel to a reformate stream comprising hydrogen;
    (b) at least one self-reducing catalyst bed;
    (c) a fuel cell stack fluidly connected to the fuel processor for receiving the reformate stream;
    (d) a recycle loop for circulating a gas stream through the fuel processor and the at least one self-reducing catalyst bed during shutdown of the fuel processing system; and
    (e) means for introducing an oxidant into the recycle loop during shutdown of the fuel processing system.

24. A self-inerting fuel processing system comprising:
    (a) a fuel processor comprising a reformer for reforming a fuel to a reformate stream comprising hydrogen;

(b) at least one self-reducing catalyst bed;

(c) a recycle loop for circulating a gas stream through the fuel processor and the at least one self-reducing catalyst bed during shutdown of the fuel processing system; and (d) an oxidant supply fluidly connected to the recycle loop for introducing an oxidant into the recycle loop during shutdown of the fuel processing system.

25. The fuel processing system of claim 24 wherein the oxidant supply is selected from the group consisting of open lines, check valves, pressurized oxidant storage containers, air compressors, burner exhaust gas outlets, and PSA off-gas outlets.

26. The fuel processing system of claim 24 wherein the oxidant supply comprises an open line.

27. The fuel processing system of claim 24 wherein the oxidant supply comprises a check valve.

28. The fuel processing system of claim 24 wherein the fuel processor further comprises a PSA unit fluidly connected to the reformer, the PSA unit having an off-gas exhaust outlet, and wherein the oxidant supply comprises the PSA off-gas exhaust outlet.

29. The fuel processing system of claim 24 wherein the fuel processor further comprises a burner associated with the reformer, the burner having an exhaust outlet, and wherein the oxidant supply comprises the burner exhaust outlet.

30. The fuel processing system of claim 24 wherein the fuel processor further comprises a selective oxidizer downstream of the reformer and fluidly connected thereto, and an air supply fluidly connected to the selective oxidizer, and wherein the oxidant supply comprises the air supply connected to the selective oxidizer.

31. The fuel processing system of claim 24 wherein the fuel processor comprises the at least one self-reducing catalyst bed.

32. The fuel processing system of claim 24 wherein the reformer comprises the at least one self-reducing catalyst bed.

33. The fuel processing system of claim 24, further comprising an auxiliary bed comprising the at least one self-reducing catalyst bed.

34. A self-inerting fuel processing system comprising:

(a) a fuel processor comprising a reformer for reforming a fuel to a reformate stream comprising hydrogen;

(b) at least one self-reducing catalyst bed;

(c) a recycle loop for circulating a gas stream through the fuel processor and the at least one self-reducing catalyst bed during shutdown of the fuel processing system; and (d) means for introducing an oxidant into the recycle loop during shutdown of the fuel processing system.

35. A method of shutting down a fuel processing system comprising a fuel processor for reforming a fuel to a reformate stream comprising hydrogen, at least one self-reducing catalyst bed, and a recycle loop for circulating a gas stream through the fuel processor and the self-reducing catalyst bed, the method comprising:

(a) interrupting supply of fuel to the fuel processor;

(b) introducing an oxidant into the recycle loop;

(c) removing at least a portion of the oxygen in the introduced air by oxidizing the at least one self-reducing catalyst bed to produce a substantially inert gas stream; and (d) circulating the substantially inert gas stream in the recycle loop.

36. The method of claim 35 wherein in step (b), oxidant is introduced into the recycle loop via an open line fluidly connected thereto.

37. The method of claim 35 wherein in step (b), oxidant is introduced into the recycle loop via a check valve fluidly connected thereto.

38. The method of claim 35 wherein the fuel processor comprises a PSA unit having an off-gas exhaust outlet fluidly connected to the recycle loop and wherein in step (b), oxidant is introduced into the recycle loop via the PSA off-gas exhaust outlet.

39. The method of claim 35 wherein the fuel processor comprises a selective oxidizer having the at least one self-reducing catalyst bed, and an air supply fluidly connected to the selective oxidizer, and wherein in step (b), oxidant is introduced into the recycle loop via the air supply.

40. The method of claim 35 wherein the fuel processor comprises the at least one self-reducing catalyst bed.

41. The method of claim 35 wherein the fuel processor comprises a reformer.

42. The method of claim 41 wherein the reformer comprises the at least one self-reducing catalyst bed.

43. The method of claim 41 wherein the fuel processor further comprises a burner associated with the reformer, the burner having a burner exhaust outlet fluidly connected to the recycle loop, and wherein in step (b), oxidant is introduced into the recycle loop via the burner exhaust outlet.

44. The method of claim 41 wherein the fuel processing system further comprises an auxiliary bed comprising the at least one self-reducing catalyst bed.

45. The method of claim 35, further comprising:

(e) purging reaction gas from the fuel processor, wherein the reaction gas comprises fuel, reformate, or both.

46. The method of claim 45 wherein step (e) further comprises catalytically combusting the reaction gas with at least a portion of the oxygen in the introduced oxidant.

47. The method of claim 45 wherein the fuel processor comprises a steam reformer and step (e) comprises purging the fuel processor with steam.

48. The method of claim 45 wherein the fuel processor comprises a steam reformer and a burner associated therewith, and step (e) further comprises supplying the reaction gas to the burner and combusting therein.

49. The method of claim 48, further comprising interrupting the supply of the reaction gas to the burner when combustion ceases therein.

50. The method of claim 45 wherein step (c) further comprises catalytically combusting the reaction gas with at least a portion of the oxygen in the introduced oxidant.

51. The method of claim 35 wherein the fuel processor is fluidly connected to a fuel cell stack for providing the reformate stream thereto, the method further comprising purging the reformate from the fuel cell stack.

52. The method of claim 51 wherein the fuel cell stack comprises a cathode exhaust outlet fluidly connected to the recycle loop, and wherein in step (b), oxidant is introduced into the recycle loop via the cathode exhaust outlet.

53. The method of claim 35, further comprising the step of interrupting the circulation of the substantially inert gas stream when the fuel processing system has reached a threshold shutdown temperature.

54. The method of claim 53, where step (d) is performed intermittently until the threshold shutdown temperature is reached.

* * * * *